(12) United States Patent
Goodwin

(10) Patent No.: US 7,725,335 B1
(45) Date of Patent: May 25, 2010

(54) SYSTEM AND METHOD FOR ELECTRONIC REMITTANCE NOTICE ANALYSIS

(75) Inventor: Bently C. Goodwin, Memphis, TN (US)

(73) Assignee: Remitdata, Inc., Memphis, TN (US)

( * ) Notice: Subject to any disclaimer, the term of this patent is extended or adjusted under 35 U.S.C. 154(b) by 1769 days.

(21) Appl. No.: 10/783,324

(22) Filed: Feb. 20, 2004

Related U.S. Application Data

(60) Provisional application No. 60/449,030, filed on Feb. 20, 2003.

(51) Int. Cl.
*G06Q 40/00* (2006.01)

(52) U.S. Cl. ......................................................... 705/4

(58) Field of Classification Search .................... 705/2, 705/4
See application file for complete search history.

(56) References Cited

U.S. PATENT DOCUMENTS

| | | | | |
|---|---|---|---|---|
| 5,550,734 A | * | 8/1996 | Tarter et al. ..................... | 705/2 |
| 5,704,044 A | | 12/1997 | Tarter et al. .................. | 395/204 |
| 5,915,241 A | | 6/1999 | Giannini ......................... | 705/2 |
| 5,970,463 A | | 10/1999 | Cave et al. ...................... | 705/3 |
| 6,208,973 B1 | * | 3/2001 | Boyer et al. .................... | 705/2 |
| 6,341,265 B1 | | 1/2002 | Provost et al. .................. | 705/4 |
| 6,343,271 B1 | | 1/2002 | Peterson et al. ................. | 705/4 |
| 6,393,404 B2 | | 5/2002 | Waters et al. ................... | 705/2 |
| 2002/0019754 A1 | | 2/2002 | Peterson et al. | |
| 2002/0035488 A1 | | 3/2002 | Aquila et al. | |
| 2002/0049618 A1 | | 4/2002 | McClure et al. | |
| 2002/0062235 A1 | | 5/2002 | Wahlbin et al. | |
| 2002/0128883 A1 | | 9/2002 | Harris | |

* cited by examiner

*Primary Examiner*—Jerry O'Connor
*Assistant Examiner*—John A Pauls
(74) *Attorney, Agent, or Firm*—Patton Boggs LLP

(57) ABSTRACT

A system and method for analyzing electronic remittance notices (ERNs) is provided. The system includes a database component and a processor component for determining benchmark, for both denial rates and/or days sales outstanding, weighted average values for a particular provider and weighted average aggregate values based on a plurality of providers ERN claim adjudication information. The ERN information may originate from one or more third-party payers for claims for medical products or procedures. The weighting of these values may mimic or approximate a particular healthcare provider's mix of medical products and/or services to provide much more meaningful information. This benchmark values may be compared to various other ERN metrics of ERN claim adjudication information to compare to aggregate healthcare provider information. Equalizer values may also be calculated, analyzed and compared.

26 Claims, 12 Drawing Sheets

| | NATIONAL AVERAGE | | | | |
|---|---|---|---|---|---|
| ITEM | DENIAL RATE | WA RATE | DSO | WA DSO | PERCENT OF BILLED |
| 1231 | 20% | 1.6% | 50 | 4.0 | 8% |
| 1232 | 21% | 0.6% | 51 | 1.5 | 3% |
| 1233 | 12% | 0.6% | 39 | 2.0 | 5% |
| 1234 | 13% | 0.4% | 40 | 1.2 | 3% |
| 1235 | 40% | 4.0% | 83 | 8.3 | 10% |
| 1236 | 28% | 1.7% | 60 | 3.6 | 6% |
| 1237 | 23% | 1.2% | 55 | 2.8 | 5% |
| 1238 | 10% | 2.0% | 36 | 7.2 | 20% |
| 1239 | 15% | 0.3% | 43 | 0.9 | 2% |
| 1240 | 11% | 0.3% | 37 | 1.1 | 3% |
| 1241 | 9% | 2.7% | 32 | 9.6 | 30% |
| 1242 | 65% | 3.3% | 100 | 5.0 | 5% |
| AVG | 22% | 18.6% | 52 | 47.1 | 100% |

*FIG. 2*

| ITEM | PROVIDER A | | | | | CUSTOM BENCHMARK | |
|---|---|---|---|---|---|---|---|
| | DENIAL RATE | WA RATE | DSO | WA DSO | PERCENT OF BILLED | DENIAL RATE | DSO |
| 1231 | 23% | 2.5% | 53 | 5.8 | 11% | 2.2% | 5.5 |
| 1232 | 19% | 1.0% | 49 | 2.5 | 5% | 1.1% | 2.6 |
| 1233 | 14% | 0.8% | 42 | 2.5 | 6% | 0.7% | 2.3 |
| 1234 | 13% | 1.0% | 40 | 3.2 | 8% | 1.0% | 3.2 |
| 1235 | 37% | 4.4% | 81 | 9.7 | 12% | 4.8% | 10.0 |
| 1236 | 35% | 2.5% | 70 | 4.9 | 7% | 2.0% | 4.2 |
| 1237 | 0% | 0.0% | 0 | - | 0% | 0.0% | 0.0 |
| 1238 | 8% | 1.4% | 34 | 6.1 | 18% | 1.8% | 6.5 |
| 1239 | 18% | 0.9% | 45 | 2.3 | 5% | 0.8% | 2.2 |
| 1240 | 12% | 0.4% | 38 | 1.1 | 3% | 0.3% | 1.1 |
| 1241 | 8% | 1.2% | 31 | 4.7 | 15% | 1.4% | 4.8 |
| 1242 | 63% | 6.3% | 98 | 9.8 | 10% | 6.5% | 10.0 |
| AVG | 21% | 22.5% | 48 | 52.6 | 100% | 22.5% | 52.3 |

| ITEM | PROVIDER B | | | | | CUSTOM BENCHMARK | |
|---|---|---|---|---|---|---|---|
| | DENIAL RATE | WA RATE | DSO | WA DSO | PERCENT OF BILLED | DENIAL RATE | DSO |
| 1231 | 24% | 0.5% | 55 | 1.1 | 2% | 0.4% | 1.0 |
| 1232 | 18% | 0.4% | 45 | 0.9 | 2% | 0.4% | 1.0 |
| 1233 | 12% | 0.2% | 39 | 0.8 | 2% | 0.2% | 0.8 |
| 1234 | 8% | 0.4% | 32 | 1.6 | 5% | 0.7% | 2.0 |
| 1235 | 28% | 0.8% | 62 | 1.9 | 3% | 1.2% | 2.5 |
| 1236 | 33% | 2.6% | 65 | 5.2 | 8% | 2.2% | 4.8 |
| 1237 | 21% | 0.6% | 50 | 1.5 | 3% | 0.7% | 1.7 |
| 1238 | 11% | 2.2% | 36 | 7.2 | 20% | 2.0% | 7.2 |
| 1239 | 12% | 1.2% | 36 | 3.6 | 10% | 1.5% | 4.3 |
| 1240 | 13% | 1.3% | 37 | 3.7 | 10% | 1.1% | 3.7 |
| 1241 | 10% | 1.0% | 33 | 3.3 | 10% | 0.9% | 3.2 |
| 1242 | 52% | 13.0% | 86 | 21.5 | 25% | 16.3% | 25.0 |
| AVG | 20% | 24.3% | 48 | 52.2 | 100% | 27.6% | 57.1 |

*FIG. 3*

| 114 | 112 | 116 DENIAL RATES BY PROCEDURE 118 | | 120 | 122 | 124 | 136 DENIAL RATES 138 | |
|---|---|---|---|---|---|---|---|---|
| HCPCS | DESCRIPTION | BILLED | ALLOWED | 144 PAID | CLAIMS | DENIALS | CUSTOMER | NATIONAL |
| E1390 | OXYGEN CONCENTRATOR 142 | $391,230 | $153,125 | $119,828 | 1,143 | 474 | 41.5% | 20.6% |
| E0260 | HOSP BED SEMI-ELECTR W/ MATT | $77,084 | $44,190 | $33,012 | 518 | 170 | 146 32.8% | 150 24.2% |
| E0431 | PORTABLE GASEOUS 02 | $77,488 | $23,423 | $16,864 | 1,153 | 496 | 43.0% | 23.8% |
| B4150 | ENTERAL FORMULAE CATEGORY I | $52,992 | $18,171 | $14,285 | 96 | 23 | 24.0% | 24.8% |
| B4035 | ENTERAL FEED SUPP PUMP PER D | $33,139 | $17,936 | $13,877 | 88 | 23 | 26.1% | 25.5% |
| K0001 | STANDARD WHEELCHAIR | $40,022 | $13,238 | $9,566 | 722 | 380 | 52.6% | 28.3% |
| E0163 | COMMODE CHAIR STATIONRY FXD | $18,172 | $12,099 | $9,404 | 156 | 45 | 28.8% | 30.9% |
| E0135 | WALKER FOLDING ADJUST/FIXED | $18,254 | $11,094 | $8,575 | 210 | 64 | 30.5% | 29.0% |
| A4253 | BLOOD GLUCOSE/REAGENT STRIPS | $40,057 | $11,312 | $8,006 | 276 | 95 | 34.4% | 15.6% |
| B4199 | PARENTERAL SOL > 100GM PROTE | $13,106 | $7,936 | $6,349 | 5 | 0 | 0.0% | 46.2% |
| L8030 | BREAST PROSTHESIS SILICONE/E | $7,026 | $6,306 | $5,045 | 24 | 0 | 0.0% | 18.0% |
| J7644 | IPRATROPIUM BROM INH SOL U D | $17,345 | $5,949 | $4,759 | 37 | 8 | 21.6% | 12.9% |
| B4154 | ENTERAL FORMULAE CATEGORY IV | $8,973 | $5,626 | $4,501 | 13 | 3 | 23.1% | 33.7% |
| E0630 | PATIENT LIFT HYDRAULIC | $7,355 | $4,868 | $3,472 | 78 | 14 | 17.9% | 17.0% |
| J7619 | ALBUTEROL INH SOL U D | $8,310 | $4,329 | $3,209 | 42 | 10 | 23.8% | 12.7% |
| B4197 | PARENTERAL SOL 74-100GM PRO | $4,588 | $3,760 | $3,008 | 4 | 1 | 25.0% | 42.0% |
| B9002 | ENTERAL INFUSION PUMP W/ ALA | $17,521 | $3,694 | $2,938 | 47 | 13 | 27.7% | 44.8% |
| E0277 | POWERED PRES-REDU AIR MATRS | $6,922 | $3,480 | $2,702 | 8 | 2 | 25.0% | 60.4% |
| B4152 | ENTERAL FORMULAE CATEGORY II | $9,132 | $3,436 | $2,633 | 23 | 6 | 26.1% | 23.5% |
| K0002 | STND HEMI (LOW SEAT) WHLCHR | $9,288 | $3,233 | $2,374 | 105 | 51 | 48.6% | 22.9% |

FROM FIG. 4a

| | | | | | | | |
|---|---|---|---|---|---|---|---|
| L8000 | MASTECTOMY BRA | $4,334 | $2,848 | $2,223 | 82 | 7 | 8.5% | 15.6% |
| E0155 | WALKER WHEEL ATTACHMENT, PAIR | $4,490 | $2,623 | $2,046 | 106 | 21 | 19.8% | 25.7% |
| E0570 | NEBULIZER WITH COMPRESSION | $11,659 | $2,429 | $1,720 | 230 | 77 | 33.5% | 17.8% |
| E0607 | BLOOD GLUCOSE MONITOR HOME | $7,817 | $1,951 | $1,532 | 64 | 35 | 54.7% | 30.4% |
| E0192 | PAD WHEELCHR LOW PRESS/POSIT | $5,167 | $1,917 | $1,504 | 10 | 5 | 50.0% | 46.7% |
| E0255 | HOSPITAL BED VAR HT W/ MATTR | $3,576 | $1,801 | $1,373 | 24 | 3 | 12.5% | 15.2% |
| B4186 | PARENTERAL SOL LIPIDS 20% | $4,902 | $1,530 | $1,224 | 11 | 3 | 27.3% | 42.6% |
| B4224 | PARENTERAL ADMINISTRATION KI | $2,836 | $1,487 | $1,189 | 12 | 2 | 16.7% | 33.2% |
| A4259 | LANCETS PER BOX | $2,630 | $1,573 | $1,162 | 196 | 65 | 33.2% | 16.0% |
| A4623 | TRACHEOSTOMY INNER CANNULA | $1,539 | $1,444 | $1,155 | 15 | 1 | 6.7% | 40.3% |
| B9006 | PARENTERAL INFUS PUMP STATIO | $5,400 | $1,417 | $1,134 | 9 | 5 | 55.6% | 55.6% |
| E0439 | STATIONARY LIQUID 02 | $5,150 | $1,378 | $1,103 | 12 | 6 | 50.0% | 24.5% |
| E0776 | IV POLE | $3,465 | $1,370 | $1,091 | 77 | 18 | 23.4% | 35.4% |
| E0600 | SUCTION PUMP PORTAB HOM MODL | $2,505 | $1,380 | $1,079 | 54 | 17 | 31.5% | 26.6% |
| OTHERS | | $169,519 | $16,066 | $12,016 | 1,363 | 855 | 62.7% | 35.9% |
| CUSTOMER GRAND TOTAL: | | $1,092,994 | $398,417 | $305,955 | 7,013 | 2,998 | 33.1% | 23.3% |
| | 152 ⟶ | 126 | 128 | 130 | 132 | 134 | 140 | 148 |
| NATIONAL GRAND TOTAL: | | $51,258,777 | $25,611,863 | $18,998,760 | 354,913 | 101,242 | | |

| 114 | 112 | 116 AVERAGE DSO BY HCPCS 120 | | 122 | 156 AVERAGE DSO 158 | |
|---|---|---|---|---|---|---|
| HCPCS | DESCRIPTION | BILLED | 162 PAID | CLAIMS | CUSTOMER | NATIONAL |
| E1390 | OXYGEN CONCENTRATOR —168 | $229,551 | $119,828 | 669 | 74 | 63 |
| E0260 | HOSP BED SEMI-ELECTR W/ MATT | $51,828 | $33,012 | 348 | 79 | 78 |
| E0431 | PORTABLE GASEOUS 02 | $42,590 | $16,864 | 657 | 74 | 70 |
| B4150 | ENTERAL FORMULAE CATEGORY I | $40,962 | $14,285 | 73 | 62 | 116 |
| B4035 | ENTERAL FEED SUPP PUMP PER D | $25,841 | $13,877 | 65 | 75 | 117 |
| K0001 | STANDARD WHEELCHAIR | $19,025 | $9,566 | 342 | 101 | 85 |
| E0163 | COMMODE CHAIR STATIONRY FXD | $12,904 | $9,404 | 111 | 81 | 115 |
| E0135 | WALKER FOLDING ADJUST/FIXED | $12,706 | $8,575 | 146 | 82 | 92 |
| A4253 | BLOOD GLUCOSE/REAGENT STRIPS | $27,131 | $8,006 | 181 | 87 | 56 |
| B4199 | PARENTERAL SOL > 100GM PROTE | $13,106 | $6,349 | 5 | 148 | 135 |
| L8030 | BREAST PROSTHESIS SILICONE/E | $7,026 | $5,045 | 24 | 136 | 94 |
| J7644 | IPRATROPIUM BROM INH SOL U D | $13,069 | $4,759 | 29 | 25 | 47 |
| B4154 | ENTERAL FORMULAE CATEGORY IV | $8,051 | $4,501 | 10 | 60 | 126 |
| E0630 | PATIENT LIFT HYDRAULIC | $6,032 | $3,472 | 64 | 48 | 64 |
| J7619 | ALBUTEROL INH SOL U D | $4,605 | $3,209 | 32 | 25 | 46 |
| B4197 | PARENTERAL SOL 74-100GM PRO | $3,911 | $3,008 | 3 | 205 | 94 |
| B9002 | ENTERAL INFUSION PUMP W/ ALA | $12,840 | $2,938 | 34 | 82 | 137 |
| E0277 | POWERED PRES-REDU AIR MATTRS | $5,166 | $2,702 | 6 | 124 | 148 |
| B4152 | ENTERAL FORMULAE CATEGORY II | $8,328 | $2,633 | 17 | 44 | 113 |
| K0002 | STND HEMI (LOW SEAT) WHLCHR | $5,265 | $2,374 | 54 | 87 | 89 |

FROM FIG. 5a

| | | | | | | |
|---|---|---|---|---|---|---|
| L8000 | MASTECTOMY BRA | $3,920 | $2,223 | 75 | 119 | 81 |
| E0155 | WALKER WHEEL ATTACHMENT, PAIR | $3,489 | $2,046 | 85 | 61 | 87 |
| E0570 | NEBULIZER WITH COMPRESSION | $6,639 | $1,720 | 153 | 82 | 48 |
| E0607 | BLOOD GLUCOSE MONITOR HOME | $3,575 | $1,532 | 29 | 100 | 121 |
| E0192 | PAD WHEELCHR LOW PRESS/POSIT | $2,372 | $1,504 | 5 | 134 | 145 |
| E0255 | HOSPITAL BED VAR HT W/ MATTR | $3,128 | $1,373 | 21 | 99 | 73 |
| B4186 | PARENTERAL SOL LIPIDS 20% | $3,668 | $1,224 | 8 | 160 | 108 |
| B4224 | PARENTERAL ADMINISTRATION KI | $2,836 | $1,189 | 10 | 176 | 83 |
| A4259 | LANCETS PER BOX | $1,723 | $1,162 | 131 | 96 | 57 |
| A4623 | TRACHEOSTOMY INNER CANNULA | $1,473 | $1,155 | 14 | 101 | 84 |
| OTHERS | | $44,078 | $16,422 | 614 | 115 | 103 |
| CUSTOMER GRAND TOTAL: 170→ | | 626,836 | 305,955 164 | 4,015 | 160 | 166 |
| NATIONAL GRAND TOTAL: | | 35,776,734 | 18,998,760 | 253,671 | | |

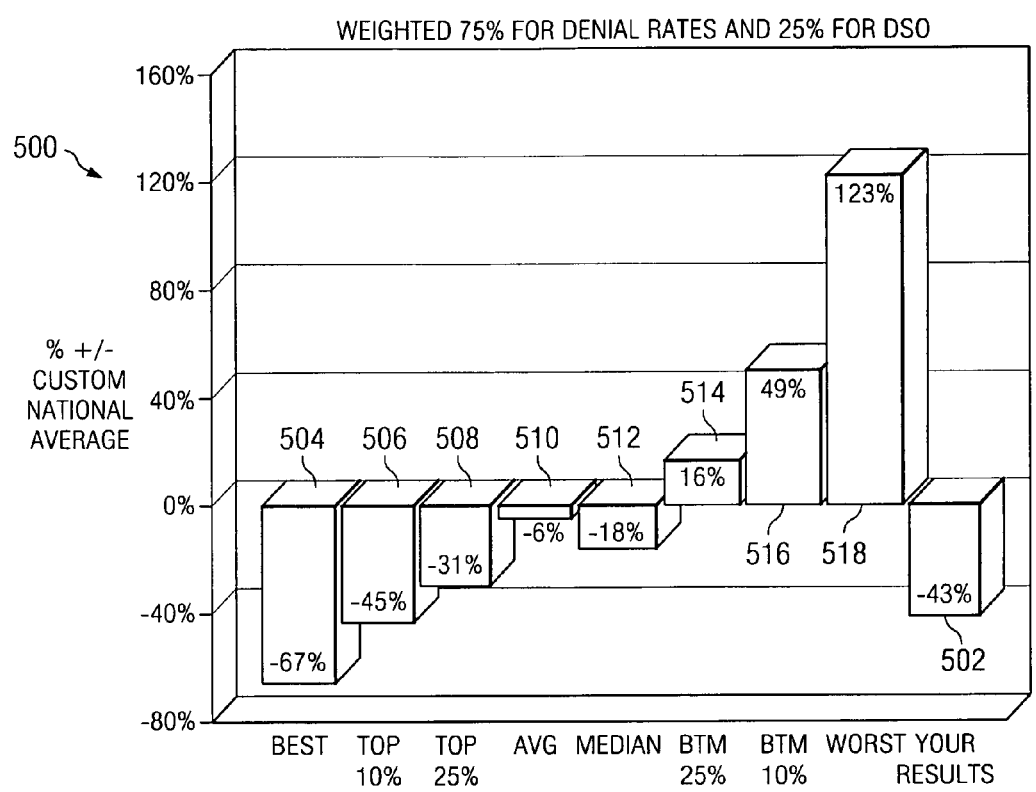

SYSTEM AND METHOD FOR ELECTRONIC REMITTANCE NOTICE ANALYSIS

CROSS-REFERENCE TO RELATED APPLICATIONS

Pursuant to 35 U.S.C. §119 (e), this application claims priority from, and hereby incorporates by reference for all purposes, U.S. Provisional Patent Application Ser. No. 60/449,030, entitled System and Method for Electronic Remittance Notice Analysis, naming Bently C. Goodwin as inventor, filed Feb. 20, 2003.

TECHNICAL FIELD OF THE INVENTION

This invention relates in general to the field of payment analysis systems and more particularly, but not by way of limitation, to a system and method for electronic remittance notice analysis.

BACKGROUND OF THE INVENTION

As with any business, the viability of medical related businesses require effective practices for the collection of payments for the goods and services it sells. The medical industry is unique, however, in that it is paid, primarily, by the patients insurers or third-party payers such as Medicare. Unfortunately, satisfying the requirements of any particular insurance company is typically a complex affair that differs from one insurance company to another.

Insurers and entitlement programs, such as Medicare, hereafter referred to as a third-party payers, may require vast numbers of forms and procedures to obtain payment for certain services performed or products sold to patients insured or serviced by these third-party payers. Also, a third-party payer may pay only a percentage or stated amount for a particular service or medical product. The third-party payers may provide an electronic record or file, such as an Electronic Remittance Notice ("ERN"), that details payments made by the third-party payers to a particular healthcare provider in response to one or more claims or requests made by the healthcare provider detailing the products and services the healthcare provider has rendered to patients serviced by the third-party payers. The ERN may detail the payment(s) being made for particular procedures, which may include goods, services, medical procedures, medical equipment and supplies ("medical products" or "procedures") rendered by the healthcare provider, and other information, such as date and patient identifying information, healthcare provider identifier information, date information, procedure information, denial/allowance information, and additional financial information or payment information. Whenever a claim is denied, the ERN also provides detailed reasons and/or codes detailing the denial.

Unfortunately, third-party payer reimbursements are not entirely consistent for any particular medical product or procedure. For example, one healthcare provider may be reimbursed for a procedure, while another healthcare provider may be denied or reimbursed a lower amount for the same procedure. In some instances, this may be based on the claims procedures or claim requests employed by the healthcare provider or based on the unpredictability of third-party payer's reimbursement policies. In either case, the current process is frustrating and financially detrimental to the healthcare provider.

SUMMARY OF THE INVENTION

The present invention provides a system and method for electronic remittance notice analysis that overcomes one or more of the problems described above. This allows a healthcare provider to reduce its denial rates for healthcare products and services it offers to patients. The present invention may aggregate Electronic Remittance Notice ("ERN") information, which includes claim adjudication information, from a plurality of healthcare providers to obtain denial rate statistics and days sales outstanding statistics for analysis and evaluation purposes to allow a healthcare provider to better manage its reimbursements and payments received from third-party payers. This often results in substantial savings being realized by healthcare providers.

The present invention may analyze a particular healthcare provider's claims and reimbursements and compare this information with numerous healthcare providers, such as a nationwide sample, by, for example, generating a customized aggregate average denial rate and/or aggregate average days sales outstanding based on the particular healthcare provider's specific medical product and services mix. In this manner, overall statistical data may be analyzed much more effectively by the particular healthcare provider to identify areas for improvement in claims practices and procedures in comparison with healthcare providers having a similar product and services mix.

In one aspect, the present invention provides a system for analyzing healthcare provider reimbursement statistics. The system includes a database component and a processor component. The database component may store or maintain information for a plurality of healthcare providers related to a denial rate and a days sales outstanding for specific medical products or procedures based on a plurality of claims provided as part of the ERN information which includes the claim adjudication information. The claim adjudication information may include any of a variety of information such as, for example, healthcare provider identifier information, date information, such as when the goods or services were provided, procedure information that includes a code or the like to identify particular goods or services being provided, denial/allowance information, and financial information. Denial/allowance information and financial information may include, for example, the amount billed for a procedure, the amount allowed for a procedure, the amount paid by a third party payer for a procedure, and data such as average denial rates for a healthcare provider or days sales outstanding for a healthcare provider.

The processor component may be operable to generate an average denial rate and an average days sales outstanding for individual medical products or services for a plurality of healthcare providers and for a particular healthcare provider of the plurality of healthcare providers for a period of time. The database component may be further operable to generate a weighted average denial rate and a weighted average days sales outstanding for the procedure, such as a medical product, for the particular healthcare provider of the plurality of healthcare providers. The weighted average denial rate and weighted average days sales outstanding are based on the relationship of the medical product or service to all other medical products or services provided by the particular healthcare provider. A weighting factor may be generated to determine the weighted average denial rate and weighted average days sales outstanding.

In one embodiment, the present invention includes an electronic remittance notice analysis system that includes a database component and a processor component. The database component is operable to maintain electronic remittance notice information for a plurality of healthcare providers, the electronic remittance notice information includes claim adjudication information for a plurality of claims for each of the plurality of healthcare providers and for a plurality of procedures, the claim adjudication information includes information for each of the plurality of claims that includes healthcare provider identifier information, date information, procedure information, denial/allowance information, and financial information. The processor component is operable to access the database component and determine, for a period of time and for a plurality of claims, an average denial rate for each of the plurality of procedures for one of the plurality of healthcare providers, an average aggregate denial rate for each of the plurality of procedures for the plurality of healthcare providers, a weighting factor for each of the plurality of procedures for the one of the plurality of healthcare providers based on the financial information, the processor further operable to determine a weighted average denial rate for the period of time for the one of the plurality of healthcare providers based on the weighting factor for each of the plurality of procedures for the one of the plurality of healthcare providers, and a weighted average aggregate denial rate for the period of time for the plurality of healthcare providers based on the weighting factor for each of the plurality of procedures for the one of the plurality of healthcare providers.

In other embodiments, the present invention includes an electronic remittance notice analysis system that includes a database component and a processor component as just described but used to analyze days sales outstanding values provided as part of the ERN information. In other embodiments, both denial rates and days sales outstanding values are analyzed and compared for a healthcare provider.

In still other embodiments or aspects of the present invention, the electronic remittance notice analysis system the processor component is further operable to determine a percentage difference between the weighted average denial rate and the weighted average aggregate denial rate to generate a denial rate equalizer. In other aspects, the electronic remittance notice analysis system the processor component is further operable to determine a percentage difference between the weighted average days sales outstanding and the weighted average aggregate days sales outstanding to generate a days sales outstanding equalizer. The electronic remittance notice analysis system may also be operable to determine a composite equalizer based on an average of the denial rate equalizer and the days sales outstanding equalizer. The composite equalizer may be weighted in favor of either the denial rate equalizer or the days sales outstanding equalizer.

In one aspect, the average denial rate for the plurality of healthcare providers (aggregated) and the average denial rate for the particular healthcare provider is defined as the percentage of denied claims relative to all claims adjudicated by the third-party payer(s) for each of the procedures or medical product by each of the plurality of healthcare providers and the particular healthcare provider.

It will be appreciated that in some aspects of the invention, claims actually submitted may be the focus of the calculations and analysis. In the present aspect, however, the calculation is based on claims actually adjudicated, or processed and responded to, by the third-party payer. Once the third-party payer, such as Medicare, actually adjudicates and responds to a claim, such as by payment of all or part of the claim, or rejects the claim, the healthcare provider may then meaningfully analyze the claim to improve business practices.

In this aspect, the weighted average denial rate is derived from the average denial rate for the particular healthcare provider for the medical product or service relative to financial information, such as the payment percentage based on the payments for the particular medical product relative the total payments received for all medical products sold by the healthcare provider.

In another aspect, the average days sales outstanding for the plurality of healthcare providers and the average days sales outstanding for the particular healthcare provider for the medical product may be calculated as the average total number of days between the date the claims are submitted by the healthcare provider and financial information, such as payment remittance by the third-party payer(s) for a particular type or group of medical products. In other aspects, the days sales outstanding is calculated as the number of days between the date the medical product or service is rendered to the patient and the date the claim is adjudicated by the third-party payer. The averages for each procedure or medical product type are weighted based on the importance to the healthcare provider, in dollars, of each type of medical product relative to all the healthcare provider's receipts.

In this aspect, the weighted average days sales outstanding is derived from the average days sales outstanding for the particular healthcare provider for the particular type of the medical product relative to the payment percentage, which is based on the payments for the particular type of medical product relative to the total payments made to the healthcare provider for all medical products sold by the healthcare provider. An overall weighted days sales outstanding may be determined or calculated based on the total of all weighted days sales outstanding calculated for all or each of the healthcare provider's medical products.

In another aspect, the processor component is operable to generate a custom aggregate benchmark denial rate based on the aggregate average denial rate for the plurality of healthcare providers relative to the relationship of the payments received for the particular type of medical product relative to all payments received for all medical products sold by the particular healthcare provider.

In another aspect, the processor component is further operable to generate a custom or weighted national benchmark days sales outstanding ("DSO") for a particular procedure or medical product and all procedures or medical products based on the national or average aggregate DSO for the plurality of healthcare providers. These averages are then weighted based on the percentage of all receipts to the particular healthcare provider represented by each type of procedure or medical product sold by the healthcare provider. In this aspect, the processor component may include a comparison component that is further operative to compare the customer benchmark days sales outstanding information.

In one aspect, the information maintained by the database component is defined as an electronic remittance notice or ERN provided by one or more third-party payers and includes claim adjudication information. In some aspects, the ERN may be thought of as an electronic document. In other aspects, the procedures or medical products are further defined as outpatient services, such as, but not limited to medical products or services under Medicare Part B.

In another aspect, the present invention further includes a healthcare provider system, an analysis system and an agent in communication with the healthcare provider system. The healthcare provider system is operable to receive the ERN information that includes claim adjudication information and the agent is operative to initiate transmission of the ERN information to the analysis system. The analysis system including a verification component operative to determine whether the ERN contains new information and is complete, accurate, balances, and may further analyze the ERN for a number of purposes.

In one aspect, the present invention provides a method for analyzing electronic remittance notices. The method includes receiving electronic remittance notice information from a third party payer, the electronic remittance notice information includes claim adjudication information for a plurality of claims for each of a plurality of healthcare providers and for a plurality of procedures, the claim adjudication information includes healthcare provider identifier information, date information, procedure information, denial/allowance information, and financial information. The method includes determining, for a period of time and for the plurality of claims for each of the plurality of procedures, an average denial rate for each of the plurality of procedures for one of the plurality of healthcare providers; and determining, for the period of time and based upon at least part of the plurality of claims, an average aggregate denial rate for each of the plurality of procedures for the plurality of healthcare providers.

The method further includes determining a weighting factor for each of the plurality of procedures for the one of the plurality of healthcare providers based on the financial information; determining a weighted average denial rate for the period of time for the one of the plurality of healthcare providers based on the weighting factor for each of the plurality of procedures for the one of the plurality of healthcare providers; and determining a weighted average aggregate denial rate for the period of time for the plurality of healthcare providers based on the weighting factor for each of the plurality of procedures for the one of the plurality of healthcare providers. The method just described may also be used in a similar manner to analyze DSO values.

In one aspect, the comparisons that may be provided by the present invention may be done through a graphical illustration or chart, while in other aspects, the comparison is defined as a columnar illustration of the denial rate and days sales outstanding.

In another aspect, the present invention analyzes the difference for one or more healthcare providers between the customer benchmark denial rate or DSO, which may be referred to as the weighted average denial rate and weighted average DSO, respectively, and the custom national benchmark denial rate or DSO, which may be referred to as the weighted average aggregate denial rate and weighted average aggregate DSO, respectively, so that healthcare provider to accurately or meaningfully compare healthcare providers, regardless of differences in each healthcare providers' mix or blend of products and services.

One advantage of the customer and custom national benchmarks calculations is that the weighted average denial rates and weighted average days sales outstanding comparisons provide healthcare providers with information specific to their particular medical business or practice by, according to one aspect, weighting significant dollar items more heavily in the computation, which provides a customized analysis based on the healthcare provider's particular blend of medical products and services.

One advantage of the present invention is that utilizing the present invention to analyze the ERN provided by the third-party payer enables healthcare providers to more readily identify those medical products whose claims have been adjudicated by the third-party payer that are not being reimbursed equivalent to national averages based on the healthcare provider's particular blend or mix of medical products.

Another advantage is that the healthcare provider may more readily identify needs for improved procedures and more aggressive claims practice for particular medical products and services, and claims based on unusually high denial rates for claims based on comparison with statistics from a plurality of healthcare providers.

Other advantages are readily apparent to one skilled in the art and from the following figures and description.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 2 is an exemplary report generated by the ERN analysis system for evaluating the denial rates and days sales outstanding of various claims provided as ERN information in accordance with another aspect of the present invention;

FIG. 3 is another exemplary report generated by the ERN analysis system for comparing a particular healthcare provider's denial rates and days sales outstanding with a custom benchmark for national average for a plurality of healthcare providers;

FIGS. 4a and 4b is a report illustrating denial rates by procedure for a select healthcare provider including the customer benchmark for comparison with a national benchmark;

FIGS. 5a and 5b is a report illustrating average days sales outstanding by procedure that includes a customer benchmark for comparison with a custom national benchmark;

FIG. 10c is a bar chart that illustrates the comparison of a composite equalizer that is the weighted average of a days sales outstanding equalizer and a denial rate equalizer for a particular healthcare provider to composite equalizer information for other healthcare providers and to aggregated composite equalizer information.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
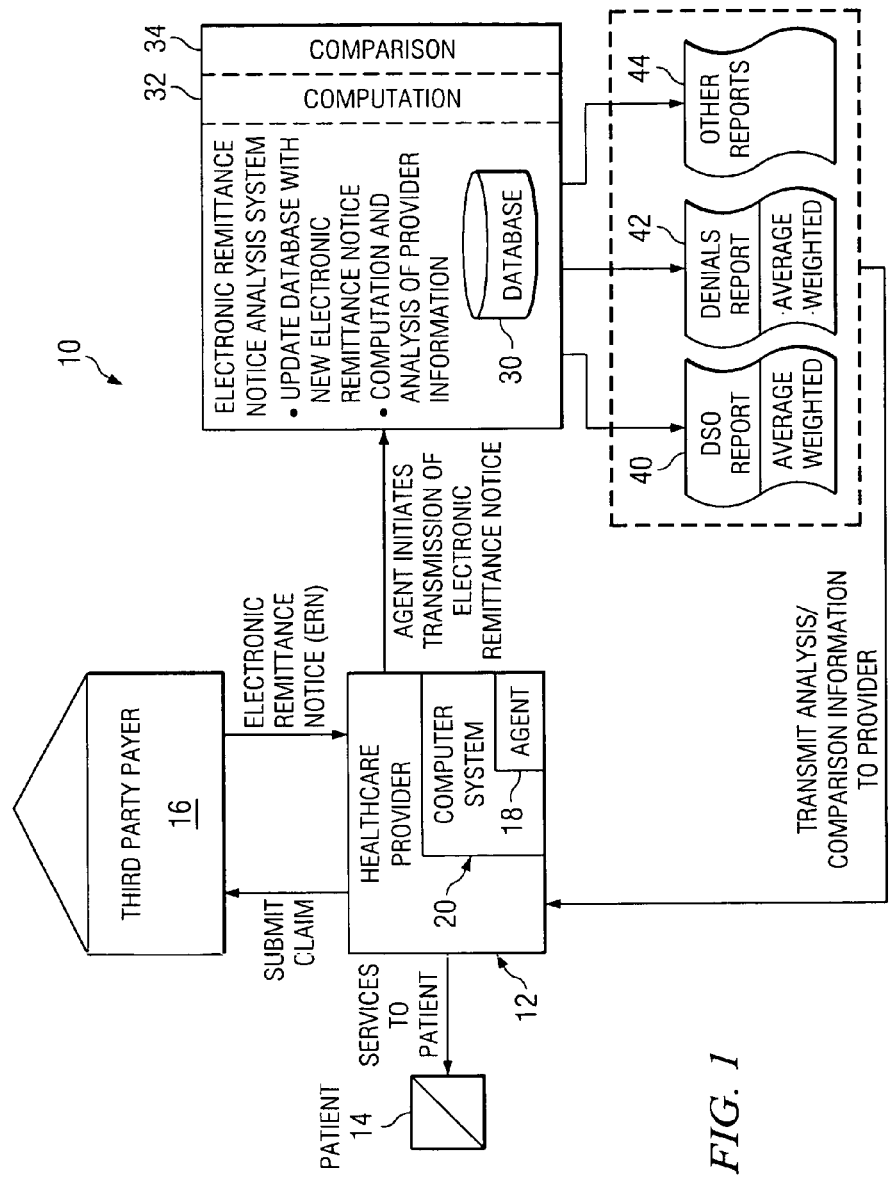
FIG. 1 is a diagrammatic illustration of one aspect of an ERN analysis system constructed in accordance with the present invention.

FIG. 1 is a diagrammatic illustration, according to one aspect of the present invention, of an ERN (electronic remittance notice) analysis system 10 for providing analysis of healthcare provider denials and receipts from third-party payers and providing benchmark statistics with aggregate ERN information that contains claim adjudication information for a healthcare provider. As previously discussed, a healthcare provider 12 may provide a wide variety of procedures (also referred to herein as medical products), which may include medical products, medical procedures, services, devices and products to patients 14.

Typically, the patient 14 is covered by some type of third-party payer 16, such as insurance or a medical reimbursement product, for example, but not limited to, entitlement programs such as Medicare, where the patient 14 is responsible for none or only a portion of the costs of the medical products or provided by the healthcare provider 12. Although only one third-party payer 16 is shown, it will be appreciated that the healthcare provider 12 may submit claims to numerous third-party payers 16.

The healthcare provider 12 may submit claims on behalf of the patient 14 for reimbursement for the medical products provided to the patient 14. Although the present invention is well suited for third-party payers, such as entitlement programs like Medicare, and health insurers, the present invention is in no way limited to such third-party payers and may be usefully employed in a number of other industries and fields outside the medical or healthcare field. In the present aspect, the healthcare provider 12 may provide any medical product, service, or procedure including, but not limited to, outpatient services reimbursable by Medicare Part B.

The third-party payer 16 periodically evaluates and adjudicates, or makes a decision, regarding a certain number of the claims submitted by the healthcare provider 12. As a result, the third-party payer 16 may remit full payment, partial payment or deny a claim, according to its payment or reimbursement policies and procedures. The third-party payer 16 returns an ERN (electronic remittance notice), which includes electronic remittance notice information that may be the considered the same or similar to claim adjudication information and includes, generally, one or more claims adjudicated for the healthcare provider 12. The ERN or claim adjudication information may include any of a variety of information. This may include healthcare provider identifier information, procedure codes, procedure information, such as the medical products provided by the healthcare provider 12, remarks, denial codes, date information, financial information on the processing of the claim, and possibly other denial/allowance information.

The ERN may also detail the amount reimbursed by the third-party payer 16 and, in the event the claim is denied, the reasons for such denial. The ERN may also include a variety of information related to the claim, such as codes identifying the type of medical product, categories for the medical product, date and other relevant information related to the claim. The ERN may be, according to one aspect, an electronic document transmitted to the healthcare provider 12.

The medical products or procedures may include goods or services, and may be identified by any number of descriptors. For example, in the healthcare industry payers, such as Medicare and insurance companies, may use such industry defined procedure codes, such as CPT, HCPCS, RC, DRG, and ABG codes, to identify various procedures. In the future, government regulated or uniform procedure code designations may be adopted in an industry such that various third party payers are using the same procedure code designations. This will allow the present invention to more easily compare denial rates and days sales outstanding information for a larger collection of providers, such as healthcare providers, and hence across a larger sampling of ERN information.

The present invention, according to one aspect, includes an agent 18, which may be implemented as a computer program, module, routine, or other computer application or system, provided on a computer system 20 of the healthcare provider 12. The agent 18 is operable to periodically initiate, such as once every evening at a predetermined time, a search for the ERN received from the third-party payer 16 on the computer system 20 and initiate transmission of the ERN to the ERN analysis system 10.

The transmission may be accomplished by a variety of techniques including via email, direct connection to the ERN analysis system 10 via the Internet, such as by VPN (virtual private network) or other direct or network connection, direct files transfer, or via other well known data communications techniques. In some aspects, the ERN analysis system 10 may obtain the ERN directly from the third-party payer 16 system, or the ERN may be manually copied from the third-party payer 16 or healthcare provider 12 system to the ERN analysis system 10, or other well known methods. In other embodiments, an intermediary, aggregator or third-party may process or provide the ERN information to either one or both of the healthcare provider 12 and the ERN analysis system 10.

The ERN analysis system 10 includes a database component 30, a computation component 32 and a comparison component 34. The ERN analysis system 10 may be implemented on one or more standard computers, workstations, servers, or implemented as an Internet website, other known platforms and system or combinations thereof. The database component may maintain information for a plurality of healthcare providers, such as the healthcare provider 12, related to the ERN provided by the third-party payer 16. The ERN analysis system 10, according to one aspect, is operative to evaluate a denial rate based on claims adjudicated by the third-party payer 16, for which the third-party payers 16 has denied payment.

The ERN analysis system 10 is further operative to evaluate a days sales outstanding for the medical product, which, in one definition, is the number of days between submission of a claim for medical products and the date by which the third-party payer 16 remits payment for reimbursement of the claim. It will be appreciated that the ERN analysis system 10, according to other aspects, is not limited to analyzing only denial rates and days sales outstanding (DSO) information and is further operable to evaluate various information related to the medical products, claims, ERN, healthcare providers 12 and third party payers 16 as described herein and otherwise.

Other analysis includes, for example, a comparison of current denials to historical denials to determine whether a particular patient recently had any denials for the same type of medical product. Such analysis may report on similar denials by patients and medical products, such as by date or other criteria. In other aspects, the analysis would compare the age of cash at the time it is colleted. By aggregating and analyzing ERNs for a plurality of healthcare providers, the present invention develops national (which may be understood t also mean aggregated for a plurality of healthcare providers) statistics for denial rates, days sales outstanding and other related data useful to the healthcare provider 12. This information may be determined for a period of time and based upon individual procedures and medical products.

As previously discussed, the present invention enables healthcare providers 12 to optimize or greatly enhance collection practices by comparing the third-party payer 16 (or multiple third-party payers) reimbursements for medical products with those of other healthcare providers 12. The computation component 32 of the present invention is operative to generate an average denial rate for the medical product for a plurality of healthcare providers, as well as for the specific healthcare provider 12.

According to one aspect, the present invention may be utilized to analyze payments from carriers, or third-party administrators, that contract with the third-party payers 16 to administer payment for services. The present invention is operable to calculate the carrier's denial rates and DSO, and perform a myriad of other calculations and analysis if desired. As such national, regional, statewide, and other geographic region information may be analyzed and calculated relative to a carrier's payment practices and histories, relative to one or more healthcare providers 12 and medical products.

The computation component 32 is further operative to generate an average DSO for the medical product for both the plurality of healthcare providers and the healthcare provider 12. It will be appreciated that the ERN analysis system 10 of the present invention may be operative to comprehensively analyze information for a number of healthcare providers 12.

The computation component 32 and the comparison component 34 may be referred to as a processor component. The computation component 32 is further operative to generate a weighted average denial rate and a weighted average days sales outstanding for one or more procedures or medical products for the particular healthcare provider, as well as, according to some aspects, for a plurality of healthcare providers during for a period of time. The average and weighted average denial rate and days sales outstanding will be discussed in greater detail hereinafter.

The ERN analysis system 10, utilizing the comparison component 34, is operable to generate reports for comparing the healthcare provider's 12 claim reimbursement data, provided on the ERN, with that of other healthcare providers by way of a DSO report 40, a denials report 42, as well as other reports 44 for thoroughly evaluating numerous aspects of the effectiveness of the healthcare provider's 12 business.

The ERN analysis system 10 may be further operable to electronically transmit the DSO report 40, the denials report 42, and the other reports 44 and other relevant information back to the computer system 20 of the healthcare provider 12. This information may be transmitted utilizing a number of well-known techniques including via email on a daily, weekly or monthly basis.

FIG. 2 is an exemplary report 50 generated, according to one aspect, by the computation component 32 and the comparison component 34, for evaluating the denial rates and days sales outstanding of various claims provided as ERN information. The report 50, however, is illustrative of calculations and analysis contemplated by the present invention. It will be appreciated that the computation component 32 is operable to analyze, from a statistical standpoint, the claims information provided by the third-party payer 16 on the ERN in a variety of manners useful to the healthcare provider 12. The report 50, in the present illustration, is one example of information that may be derived from a plurality of ERNs remitted to numerous healthcare providers 12 and used by the ERN analysis system 10 for generating aggregate information on a national, regional or other basis regarding medical products claims and reimbursement.

The procedures or medical products are itemized under the item 52 column, which lists an item number 54 associated with each medical product to identify the specific medical product. These item numbers 54 may be Healthcare Common Procedure Coding System (HCPCS), Current Procedural Terminology (CPT) or other standard procedural codes or other useful or recognized codes employed by the medical or applicable industry. A denial rate 56 is calculated for each procedure or for the total, according to one aspect, by determining the total number of claims that were denied by the third-party payer 16, for example, as compared to the total number of claims adjudicated.

A percentage of billed 58 (which may be referred to as a weighting factor) represents the dollar value of a particular medical product as a percentage of the total for the plurality of healthcare providers. In some aspects, the percentage of billed 58 may be based on the total amounts billed, or number of medical products for particular categories, or based on only payments received from the third-party payer 16, or other insurers, as previously discussed. In other aspects, the percentage of billed 58 is based on dollars actually received for claims that have been adjudicated or other financial or claim adjudication information.

In one aspect, the computation component is operable to generate a WA rate 60 (weighted average rate) that represents the denial rate 56 of a particular medical product relative to its percentage of billed 58, which, as previously discussed, may be based on the dollar amount remitted on adjudicated claims. For example, the WA rate 60 may be derived, according to one aspect, by multiplying the percentage of billed 58 for a particular medical product by the denial rate 56 for that medical product.

The WA rate 60 is a useful statistic, since some medical products may have a very high denial rate 56, but be an insignificant portion of the total percentage of billed 58 for a particular healthcare provider. In this case, the healthcare provider 12 would be less concerned about the denial rate 56 for that medical product. However, where a high denial rate 56 is related to a medical product that represents a significant percentage of billed 58 for the healthcare provider 12, the WA rate 60 would be much higher and provide the healthcare provider 12 with a quick and easy means of identifying medical products that needs to be more carefully monitored, whether this is by modifying claims submission procedures or otherwise.

In this aspect, the DSO 62 (days sales outstanding), according to one aspect, represents the total number of days between the date that the healthcare provider 12 renders the medical product and the date that the third-party payer 16 remits or denies payment for that particular medical product. This statistic allows the healthcare provider 12 to identify the age of accounts receivable and the time delay between rendering service and submitting claims and ultimately being reimbursed by the insurer.

A WA DSO 64 (weighted average days sales outstanding) is derived, according to one aspect of the present invention, by determining the DSO 62 for a particular procedure or medical product relative to the percentage of billed 58, which may be payments actually received for a period, for that medical product. The WA DSO 64 is a useful statistic for determining the significance of the time delay for payment for a particular medical product based on the value, in terms of billing or payments received, that the particular medical product has to the healthcare provider 12. Thus, a medical product that has a high WA DSO 64, but represents a low percentage of billed 58 would have a lower WA DSO 64. The healthcare provider 12 might place less importance on the time delay for particular medical products that have a smaller dollar value to the healthcare provider.

Conversely, a lower DSO 62 for a medical product that represents a higher percentage of billed 58 will produce a higher WA DSO 64. A higher WA DSO 64 will readily identify to the healthcare provider 12 the effect of slow payment for medical products that have a greater financial significance to the overall business of the healthcare provider 12. The report 50 may also include averages or totals 66 for each of the columnar headings.

The report 50 illustrated in FIG. 2 provides the healthcare provider 12 with a quick overview of national denial rate 56 (which may based on all or a portion of the total ERN claim adjudication information) and DSO 62 for a plurality of medical products. It should be appreciated that the methods for deriving the denial rate 56, the WA rate 60, the DSO 62, the WA DSO 64 and the percentage of billed 58 have been described, according to one aspect of the present invention, and that, according to other aspects, other computational methods may be utilized to achieve these statistics. According to other aspects, the denial rate 56, the WA rate 60, the DSO 62, the WA DSO 64 and percentage of billed 58 may be derived according to other formulas and the present invention is in no way limited to the particular computations described herein.

FIG. 3 is an exemplary report 70 that may be produced by the computation component 32 and comparison component 34 of the ERN analysis system 10, however, the report 70 is only illustrative of calculations and analysis by the present invention. The custom report 70 illustrates an analysis of provider A 72 and provider B 74, which represent healthcare providers' 12 submissions and reimbursements for various medical products. For the purposes of this description, only the portion of the custom report 70 describing provider A will be described, since the provider B information is derived and provided in substantially the same manner.

An item column 76 is provided for listing numbers associated with particular medical products, as previously discussed. A denial rate 78 (which provides an average denial rate for each procedure of item 76) is similar to the denial rate 56 provided in the report 50, except that the denial rate 78 is based on the denial rate for the particular procedures or medical products identified by item 76 as a percentage of all the claims adjudicated by the third-party payer 16 for provider A 72 for that type of procedure or medical product.

It can be seen that the informational headings under the provider A 72 relate specifically to provider A's 72 medical business. For example, a percentage of billed 80 identifies the total percentage of all billing or payments actually received for a particular period for provider A 72 represented by each medical product. The percentage of billed 80 (which may serve as a weighting factor) allows the healthcare provider 12 to quickly identify the medical products that represent the most significant portion of the healthcare provider's 12 business. In this manner, the healthcare provider 12 can focus attention on the medical products that are the most important to the healthcare provider 12 from a financial perspective.

A WA rate 82 (weighted average rate), according to one aspect, is computed substantially similar to the WA rate 60 of the report 50, in that the WA rate 82 represents a statistical analysis of the denial rate 78 for the particular medical product relative to the medical products weight as a percentage of billed 80, which may represent payments received or billed, for the healthcare provider 12. The WA rate 82 is calculated so that a higher WA rate 82 indicates a medical product that either has a high denial rate 78 or represents a significant percentage of billed 80 or a combination of both. A lower WA rate 82 represents a medical product that has a lower denial rate or represents a low percentage of billed 80 for the healthcare provider 12, in this case, provider A 72.

A DSO 84 (day sales outstanding) represents the calendar days from the date the medical product is rendered by the healthcare provider 12 to the patient until the date that the third-party payer 16 adjudicates the claims. According to one aspect, the present invention may calculate the DSO 84 based on when the payment or denial is actually received by the healthcare provider 12.

In other aspects, the present invention may calculate the number of days from the date the medical product is rendered by the healthcare provider 12 until the date that the healthcare provider 12 submits the claim to the third-party payer 16. In other aspects, the number of days from the date the claim is submitted by the healthcare provider 12 until payment is made by the third-party payer 16 or received by the healthcare provider 12 may also be calculated. Other time intervals related thereto may also be calculated and analyzed and are within the spirit and scope of the present invention.

According to one aspect, the DSO 84 (which provides an average DSO 84 for each of the items 76) may be calculated as the total number of days between the date of claims submission and the date of payment for all adjudicated claims, divided by the total number of claims adjudicated by the third-party payer 16. A high DSO 84 number indicates a longer lag between submission and the remittance of payment to the healthcare provider 12.

A WA DSO 86 (weighted average days sales outstanding) weights, similar to that described above, the DSO 84 relative to the percentage of billed 80 represented by the particular medical product. The WA DSO 86 will produce a higher number for products where payment is delayed or for medical products that represent a significant percentage of billed 80, or both, for the healthcare provider 12. A lower WA DSO 86 number indicates to the healthcare provider 12 that payments are being more timely made for the particular medical product or for medical products that represent a lower percentage of billed 80 for the healthcare provider 12.

The customized report 70 further is provided with a custom benchmark portion 90 that provides statistical information related to national average denial rate and days sales outstanding customized to the particular healthcare provider's 12 business specific mix or blend of products. For example, the custom benchmark denial rate 92 (which may be referred to as a weighted average aggregate denial rate by procedure) is derived by determining the national average denial rate 56 from the report 50 for the particular medical product and calculating the national average denial rate 56 as a percentage of billed 80 represented by that type of medical product for the particular healthcare provider, here provider A 72. The custom benchmark denial rate 92 is a useful statistic that can be quickly compared to the WA rate 82 to evaluate the healthcare provider's 12 denial rate 78 for particular medical products against the national average denial rate 56. The custom benchmark denial rate 92 represents the national average denial rate 56 weighted to the healthcare provider's 12 particular blend of products.

For example, denial rates nationwide for one medical product may be higher or lower than the denial rates 78 for provider A 72. The custom benchmark denial rate 92 allows provider A 72 to quickly and easily evaluate provider A's 72 denial rate 78 relative to the national denial rate by evaluating both denial rates 78 and 56 as a percentage of billed 80 represented by the medical product for provider A 72.

This is one advantage of the present invention in that the custom benchmark denial rate 92 readily compares the WA rate 82 for an apples-to-apples comparison of denial rates for a particular medical product. This allows the provider A 72 to compare denial rates 78 with others nationally customized based on provider A's 72 specific medical product mix.

A custom benchmark DSO 94 (days sales outstanding) (which may be referred to as weighted average aggregate days sales outstanding by procedure) is computed by determining the national average DSO 62 from report 50 for a particular medical product as a percent of billed 80 for provider A 72 for that medical product. Again, the custom benchmark DSO 94 may be readily compared with the WA DSO 86 and allows provider A 72 to compare, on an apples-to-apples basis, provider A's 72 payment lag for a medical product relative to the national average payment lag for the same medical product.

This provides another advantage of the present invention since provider A 72 can quickly identify medical products where the payment for claims submitted on a particular product are not being paid to provider A 72 as timely or quickly as the national average. This statistical information is customized for provider A 72 and allows provider A 72 to determine, based on provider A's 72 mix or blend of products, whether provider A 72 is being denied or delayed payment similar to other healthcare providers 12 across the nation.

One advantage of the present invention is a total average WA rate 98 (which may be referred to as weighted average denial rate for Provider A) may be conveniently compared with a total custom benchmark denial rate total 100 (which may be referred to as weighted average aggregate denial rate for Provider A). This provides a straight-forward means of evaluating provider A's 72 overall denial statistics with national denial statistics, weighted based on the particular healthcare provider's 12 medical product mix. Similarly, another advantage is a total WA DSO 102 (which may be referred to as weighted average days sales outstanding for Provider A) that may be usefully compared to a total custom benchmark DSO 104 (which may be referred to as weighted average aggregate days sales outstanding for Provider A) to optimize the healthcare provider's 12 submission and collection practices for all medical products relative to the national average, weighted based on the particular healthcare provider's 12 medical product mix.

It will be appreciated that a number of other customized statistics may be derived by manipulation and comparison of national average denial, DSO and other information obtained from the ERN, or otherwise, relative to that of the particular healthcare provider 12. Further, while the custom benchmark denial rate 92 and custom benchmark DSO 94 have been illustrated according to one computation, it will be appreciated that in other aspects other methods of deriving the custom benchmark denial rate 92 and custom benchmark DSO 94 may be utilized for these purposes and are within the spirit and scope of the present invention.

FIGS. 4a and 4b is a report 110 illustrating denial rates by procedure for a particular healthcare provider 12 that includes a customer benchmark for the healthcare provider 12 that is a weighted average value (such as a weighted average denial rate or a weighted average days sales outstanding) for comparison with a national benchmark, which may be a weighted average aggregate value (such as a weighted average aggregate denial rate or a weighted average aggregate days sales outstanding). The report 110 is advantageously provided for analysis by the healthcare provider 12 to compare the denial rates, on a weighted basis, to the national denial rates. The report 110 lists a description 112 for each medical product and a code 114 or item number associated with each procedure or medical product, in this case the HCPCS for each medical product is provided.

A billed 116 column is provided on the report 110 to detail the total amounts billed to the healthcare provider 12 for the particular medical product. It should be appreciated that the amounts billed 116 may actually represent the amounts billed for the claims that have been adjudicated and for which payment has been remitted by the third-party payer 16 at the time that the report 110 is generated by the present invention. The report 110 also includes an allowed 118 column for dollar amounts allowed by the third-party payer 16 for the particular medical product. For example, the third-party payer 16 may only allow a predetermined amount for a particular medical product, regardless of what amount the healthcare provider 12 actually bills for that medical product.

The report 110 includes a paid 120 column representing the amount the third-party payer(s) 16 have remitted for the adjudicated claims for these types of medical products. The report 110 includes a claims 122 and a denials 124 columns for illustrating the number of claims for the particular medical product that have been adjudicated by the third-party payer 16 and the number of claims that have been denied.

A total billed 126, a total allowed 128, a total paid 130, a total claims 132 and a total denials 134 cumulative data elements are illustrative of the type of information that is provided on the report 110, but it will be appreciated that a number of categories, totals, subtotals and other ways of illustrating this information may also be provided and is within the spirit and scope of the present invention.

The report 110 further includes a customer denial rates 136 and a national denial rates 138 columns. The customer denial rates 136 are calculated by determining the percentage of denials 124 relative to the total number of claims 122 adjudicated for a particular medical product as itemized on the report 110. The national denial rates 138 represent the denial rate for the particular medical product on a nationwide basis utilizing data from a plurality of healthcare providers analyzed by the present invention. In other aspects, the denial rates 136 are calculated for any geographic area, and/or for only certain third-party payers 16.

It is readily apparent that illustrating the customer denial rates 136 and national denial rates 138 in this manner provides the healthcare provider with useful information with regard to denial rates on particular medical products. The report 110 further includes a customer benchmark denial rate 140 which represents the customer benchmark denial rates 136 for each medical product weighted with respect to the particular medical products' importance in terms of amounts paid 120.

In one aspect, the customer benchmark denial rate 136 may be calculated by determining the weighted average denial rate (not shown) for each medical product and then summing the weighted average denial rates of all medical products. For example, the weighted average denial rate for a first product 142 may be obtained by dividing all payments 144 received for the first product 142 by the total payments 130 and multiplying this result times the denial rate 146 for the first product 142. By summing the weighted average denial rates of all medical products the customer benchmark denial rate 140 may be obtained.

A custom national benchmark denial rate 148 is similarly obtained, except that the national denial rate 150 for the first product 142 is utilized instead of the customer's denial rate 146. It will be appreciated that the customer benchmark denial rate 140 and custom national benchmark denial rate 148 provide the healthcare provider 12 with a quick view of overall weighted denial rates weighted according to each medical product's economic impact on the healthcare provider 12. The customer benchmark denial rate 140 is usefully compared with the national benchmark denial rate 148, which has been customized to the same weighting of each product according to the medical product's economic value to the healthcare provider 12 and is a significant advantage provided by the present invention.

It will be appreciated that the weighted average denial rate calculations, as well as the calculations for the customer benchmark denial rate 140 and custom national benchmark denial rate 148 may, according to other aspects, utilize amounts allowed 118 relative to those that have been paid 120 or may be weighted based on the total billed 126 or total allowed 128. Other examples of information that may be provided on the report 120 that may be useful for analysis include national grand totals 152 for each of the categories of the report.

FIGS. 5a and 5b is a report 154 that illustrates average DSO by a particular procedure code 114 or medical product code 114, such as HCPCS, and includes customized benchmarks. The report 154 is similar to the report 110 illustrated in FIGS. 4A-4B with respect to the code 114, description 112, billed 116, paid 120, and claims 122 for a plurality of medical products for a healthcare provider 12.

The report 154 analyzes the DSO, which, as previously discussed, may be the days from the date the medical product is sold, or procedure is performed, until the third-party payer 16 remits payment, or denies a claim. It will be appreciated that the DSO may be calculated using other criteria, as previously discussed above. In this manner, the customer average DSO 156 is calculated for each medical product and the national average day sales outstanding 158 is also provided in the report 154.

The report 154 also includes a customer benchmark DSO 160, which is calculated by summing the weighted average DSO for each of the medical products. The weighted average DSO is the percentage of a total paid 164 for all medical products represented by a paid 162 for that type of medical product multiplied by the customer average DSO 156 for that medical products. A custom national benchmark DSO 166 is calculated similar to the customer benchmark denial rate except that the national average DSO 158 for a particular medical product is utilized instead of the customer's average DSO for this calculation.

For example, all payments 162 made for a particular medical device are divided by the total paid 164 for all medical products to determine the percentage of business represented by a particular medical product 168, which is then multiplied by the national average DSO 158 for that medical product. The national weighted average DSO (not shown) for each medical product, type or category are then summed to derive the custom national benchmark DSO 166.

It will be appreciated that the customer benchmark DSO 160, when compared with the custom national benchmark DSO 166, provides for useful analysis of the delay between providing medical service and remittance of payment and provides a significant advantage of the present invention. The report 154, similar to the report 110, may calculate the average day sales outstanding on a customer and national basis based on other criterion as mentioned herein, or as may be usefully generated for these purposes, and may utilize, under different aspects of this invention, various criterion for generating the custom national benchmark DSO 166 and customer benchmark DSO 160 and still be within the spirit and scope of the present invention. The report 154 may also include additional useful information such as, but not limited to, national grand totals 170 related to information provided on the report 154.

Figure 6:
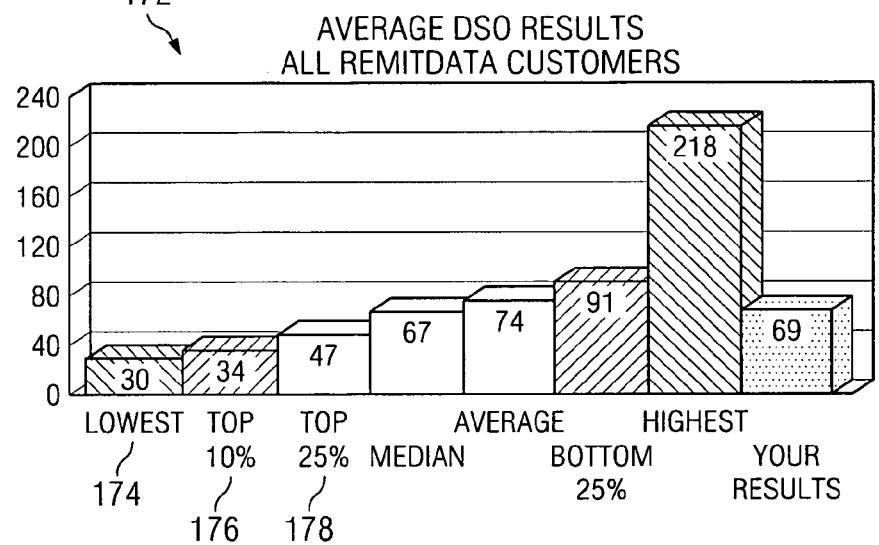
FIG. 6 is a report graphically illustrating average days sales outstanding for a particular healthcare provider for comparison with other healthcare providers.

FIG. 6 is a report 172 that graphically illustrates average day sales outstanding results for a particular healthcare provider 12 as compared to all healthcare providers whose data is analyzed according to the present invention. The report 172 is an example of average days sales outstanding for claims adjudicated by third-party payers where no weighting or benchmarking is conducted. Nevertheless, the report 172 is a useful means for analyzing the day sales outstanding for a customer for comparative purposes.

The report 172 illustrates the plurality of healthcare provider information shown in categories such as lowest 174, top ten percent, 176 top twenty-five percent 178, and so on. It will be appreciated that a number of graphic illustrations may be used, as well as presenting information on average day sales outstanding according to different criterion, all of which are within the spirit and scope of the present invention.

Figure 7:
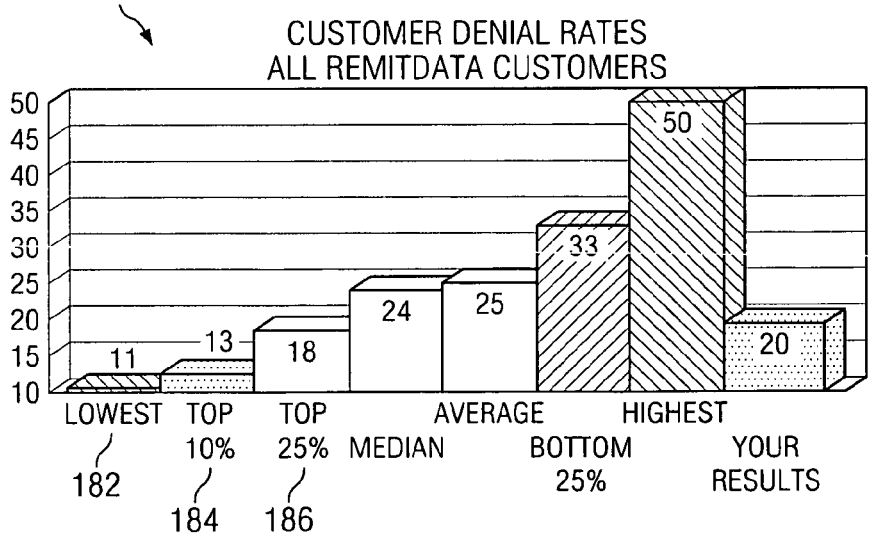
FIG. 7 is a report graphically illustrating denial rates for a particular healthcare provider for comparison with other healthcare providers.

FIG. 7 is a report 180 that graphically illustrates customer denial rates for a particular healthcare provider 12 in comparison to a plurality of healthcare providers whose data is aggregated and analyzed according to the present invention. The report 180 allows the healthcare provider 12 to quickly compare its denial rates to those of other healthcare providers. The report 180 presents denial rates in categories such as lowest 182, top ten percent 184, top twenty-five percent 186, and so on.

It will be appreciated that denial rate information may be illustrated and presented in a variety of manners that are useful for these purposes and are within the spirit and scope of the present invention. The report 180 illustrates total denial rates without calculating weighted averages or custom benchmarks. The report 180 may be useful for determining overall denial rates or totals, as well as denial rates for specific medical products or groups of medical products, for example.

Figure 8A:
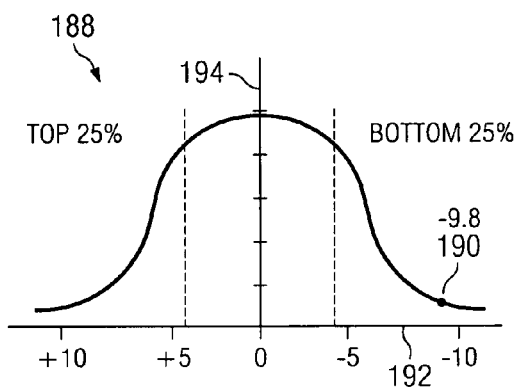
FIG. 8a is a report useful for comparing the performance of healthcare providers based on each healthcare provider's variation of the customer benchmark and custom national benchmark denial rates.
Figure 8B:
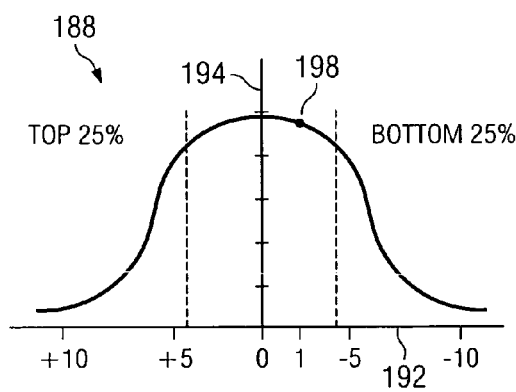
FIG. 8b is another report useful for comparing the performance of healthcare providers based on each healthcare provider's variation of the customer benchmark and custom national benchmark days sales outstanding.

FIGS. 8a and 8b provide a custom benchmark report 188 to graphically illustrate the performance of healthcare providers with respect to denial rates, DSO, and other information that may be usefully derived from the ERNs or otherwise. It will be appreciated that it is difficult, if not impossible, to fairly compare two healthcare providers 12 with regard to the denial rates and DSO, since every healthcare provider 12 has a unique mix or blend of products each having a unique set of problems regarding claims submission, processing and remittance.

For this reason, a method of analyzing healthcare providers is needed that removes the unique characteristics of the healthcare provider's 12 business so that a plurality of healthcare providers' statistics may be accurately and fairly compared to one another. The custom benchmark report 188 achieves this goal by comparing each healthcare provider's 12 customer benchmark denial rate 140 (which may be referred to as a weighted average denial rate) or DSO 160 (which may be referred to as a weighted average DSO) to that particular healthcare provider's 12 custom national benchmark denial 148 (which may be referred to as a weighted average aggregate denial rate) or DSO 166 (which may be referred to as a weighted average aggregate DSO).

For example, referring to FIGS. 4a and 4b and FIG. 8a, it can be seen that the customer benchmark denial rate 140 for this particular healthcare provider 12 is 33.1% where the custom national benchmark denial rate 148 calculated for this particular healthcare provider 12 is 23.3%. By subtracting the customer benchmark denial rate 140 from the custom national benchmark denial rate 148, produces a variation of negative 9.8 illustrated on the custom benchmark report 188 as a point 190. In other embodiments, a denial rate equalizer may be determined by taking the percentage difference between the customer benchmark denial rate 140 and the custom national benchmark denial rate 148.

Referring to FIGS. 5a and 5b and FIG. 8b, it can be seen that the customer benchmark DSO 160 for this particular healthcare provider 12 is 82 where the custom national benchmark DSO 166 calculated for this particular healthcare provider 12 is 81. By subtracting the customer benchmark DSO 160 from the custom national benchmark DSO 166, produces a variation of negative 1 illustrated on the custom benchmark report 188 as a point 198. In other embodiments, a days sales outstanding equalizer may be determined by taking the percentage difference between the customer benchmark DSO 160 and the custom national benchmark DSO 166.

The X-axis 192 or horizontal line of the graph on the custom benchmark report 188 represents the healthcare provider's 12 variation from the computed custom national benchmark denial rate 148 or DSO 166. The vertical or Y-axis 194 represents the total number of healthcare providers analyzed by the custom benchmark report 188. By utilizing the variation from the healthcare provider's 12 custom national benchmark enables healthcare providers 12 to be compared to one another regardless of their particular mix or blend of medical products.

In this manner, the healthcare provider 12 can compare the efficiency of its denial rate or DSO, or other statistical data generated by the present invention, compared to other healthcare providers with the unique characteristics of each healthcare provided removed from the calculations. The point 190 (see FIG. 8a) on the custom benchmark report 188 represents a healthcare provider 12 with a higher-than-average denial rate which places that healthcare provider in the bottom 25% of all healthcare providers analyzed by the present invention. While the point 198 (see FIG. 8b) on the custom benchmark report 188 represents a healthcare provider 12 with a days sales outstanding only slightly below average for all healthcare providers.

It will be appreciated that a number of other methods for comparing healthcare providers 12 with regard to the relationship between the customer benchmark denial 140 or DSO 148 and that particular healthcare provider's 12 custom national benchmark denial rate 148 or DSO 166 may be utilized and illustrated in a number variations, including graphs, charts, or columnar formats and are within the spirit and scope of the present invention.

A number of other advantages and methods for obtaining information from healthcare providers and aggregating, calculating and comparing this information may be provided. The presently-described and illustrated figures are provided as examples of useful analysis that may be accomplished by the present invention, but should not in any way limit the present invention to those calculations, analyses or reports.

Other examples of reporting capabilities contemplated by the present invention include, but are not limited to, calculating aged cash, payer denial rates, most common denial codes, denial rates by code, day sales outstanding by code, summary reports, for example, by reason code and procedure, average payment levels by procedure, payment lag by procedure, national cash collections by aging category as compared with cash collections by aging category for a particular healthcare provider, national reason code frequency, and healthcare provider reason code by frequency.

Figure 9:
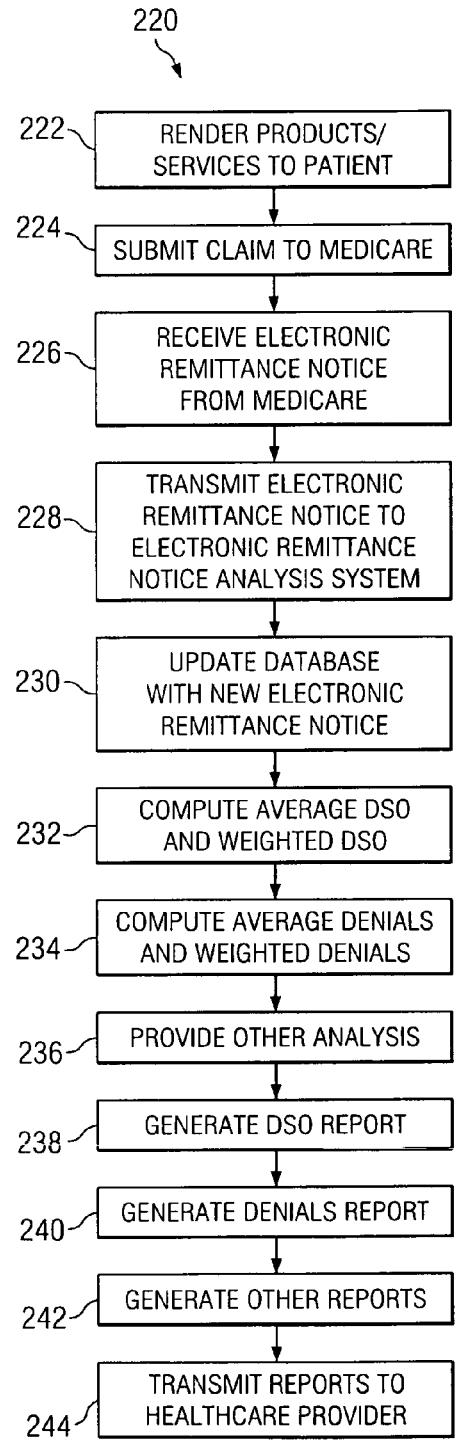
FIG. 9 is flow-chart illustrating a method for analyzing electronic remittance notice information according to one aspect of the present invention.

FIG. 9 is a flowchart illustrating a method 220 for ERN analysis. At a block 222, the healthcare provider 12 renders products and services to the patient 14, such as medical procedures, products, services or devices and equipment. The healthcare provider 12, at a block 224, submits a claim to the third-party payer 16 for the medical products rendered to the patient 14. The third-party payer 16 evaluates and adjudicates the claim and, at a block 226, the healthcare provider 12 receives the ERN (electronics remittance notice) from the third-party payer 16.

The ERN, as previously discussed, provides a detailed description of claim adjudication information and may include such information as payments for medical products or, where payment has been denied, the reasons for the denial. At a block 228, the ERN is transmitted to the ERN analysis system 10 of the present invention. In one aspect, as previously discussed, the agent 18 may be in communication with the computer system 20 of the healthcare provider 12 and automatically initiate transmission of the ERN based on predetermined criteria.

The ERN analysis system 10 may be employed as a computer application deployed completely or partially on a stand-alone computer, a network workstation or server, an Internet website, or other platforms or architectures for deploying such computer applications. The ERN system 10 updates the database 30 with the new ERN information, at a block 230. While the database 30 is illustrated as a single database 30, it should be appreciated that the data utilized by the ERN analysis system 10 may be maintained on multiple computer files, databases or tables located on or in communication with the ERN analysis system 10, the healthcare provider 12 computer system 20 or otherwise utilized as a local or distributed database 30. The ERN analysis system 10, according to one aspect, may evaluate the ERN received from the computer system 20 to verify that the ERN is not a duplicate.

At a block 232, the computation component 32 computes the average DSO and weighted DSO information. At a block 234, the computation component 32 computes average denials and weighted denials for medical products based on the information contained in the ERN. At a block 236, the ERN analysis system 10 may also provide, according to other aspects, additional or other analysis of the ERN adjudicated by the third-party payer 16.

Block 232 and/or block 234 may be thought of as analyzing the ERN information. In one embodiment, the analysis of block 232 may include the following: receiving electronic remittance notice information from a third party payer, the electronic remittance notice information includes claim adjudication information for a plurality of claims for each of a plurality of healthcare providers and for a plurality of procedures, the claim adjudication information includes healthcare provider identifier information, date information, procedure information, denial/allowance information, and financial information. This may further include: determining, for a period of time and for the plurality of claims for each of the plurality of procedures, an average denial rate for each of the plurality of procedures for one of the plurality of healthcare providers; determining, for the period of time and based upon at least part of the plurality of claims, an average aggregate denial rate for each of the plurality of procedures for the plurality of healthcare providers; determining a weighting factor for each of the plurality of procedures for the one of the plurality of healthcare providers based on the financial information; determining a weighted average denial rate for the period of time for the one of the plurality of healthcare providers based on the weighting factor for each of the plurality of procedures for the one of the plurality of healthcare providers; and determining a weighted average aggregate denial rate for the period of time for the plurality of healthcare providers based on the weighting factor for each of the plurality of procedures for the one of the plurality of healthcare providers.

The analysis provided by block 232 may also include comparing the weighted average denial rate and the weighted average aggregate denial rate, and calculating a denial rate equalizer. This may be done by determining a percentage difference between the weighted average denial rate and the weighted average aggregate denial rate to generate the denial rate equalizer.

The analysis of block 232 relative to denial rates may be applied similarly to the analysis of block 234 for days sales outstanding. In one embodiment, once a denial rate equalizer and a days sales outstanding equalizer are determined, a composite equalizer may be determined by averaging (through either a straight average or a weighted average) the denial rate equalizer and a days sales outstanding equalizer. As will be shown in FIGS. 10*a*, 10*b* and 10*c*, the comparison of equalizer information can be extremely powerful in analyzing the claims adjudication for a healthcare provider.

At a block 238, the comparison component 34 may be used to generate the DSO report, which includes average and weighted DSO statistical data. At a block 240, the comparison component 34 generates the denials report 42, which may include average and weighted average denial statistics. In some aspects, the DSO report 40 and denials report 42 may be combined in a single report or multiple reports containing both DSO and denials data, as well as other statistical information.

These reports may further include custom benchmark data such as the custom national benchmark denial rate 148, customer benchmark denial rate 140, customer benchmark DSO 160, and national benchmark DSO 166, for example. The comparison component 34, at a block 242, generates other reports which may be useful for analyzing the relevance of medical products and payment histories for the healthcare provider's 12 business based on claim submission and payment remittance. For example, the bar charts of FIGS. 10*a*, 10*b* and 10*c* may be generated to display the equalizer data.

At a block 244, the electronic analysis system 10 transmits reports, such as the DSO report 40, the denial report 42 and other reports 44 to the healthcare provider 12. In some aspects, the reports may be transmitted via email, while in other aspects, the healthcare provider's 12 computer system 20 may automatically fetch or download these reports from, for example, a secure Internet website or, in yet other aspects, these reports may be obtained according to a variety of other well-known data communication techniques.

One advantage of the present invention is that the ERN analysis system 10 aggregates ERN information for healthcare providers 12 to assist the healthcare providers 12 in comparison of statistical claims submission and payment remittance data relative to other healthcare providers that provide the same products and services for analysis based on the mix of medical products. This may be achieved, according to one aspect, by filtering and generating statistical data based on specific medical products, by specific information related to the healthcare provider 12, based on the insurer information, based on patient statistics, based on costs for medical products, or a variety of other information.

It will be appreciated that medical information is highly confidential and is important that no personal information identifying patients 14 be transmitted or communicated from the healthcare provider 12 to third parties. For this reason, according to one aspect, the agent and/or ERN analysis system 10 may strip away, filter or otherwise remove any personally-identifiable information so as to generate statistics based on only aggregate non-personal information. This is another advantage of the present invention in that no personal information of the patient 14 is utilized for the present invention. In addition, the present invention may utilize a highly-secure encryption methodology, such as 128-bit encryption when transmitting data, while in other aspects, the transmitted files themselves may be encrypted prior to transmission and decrypted upon receipt.

Figure 10A:
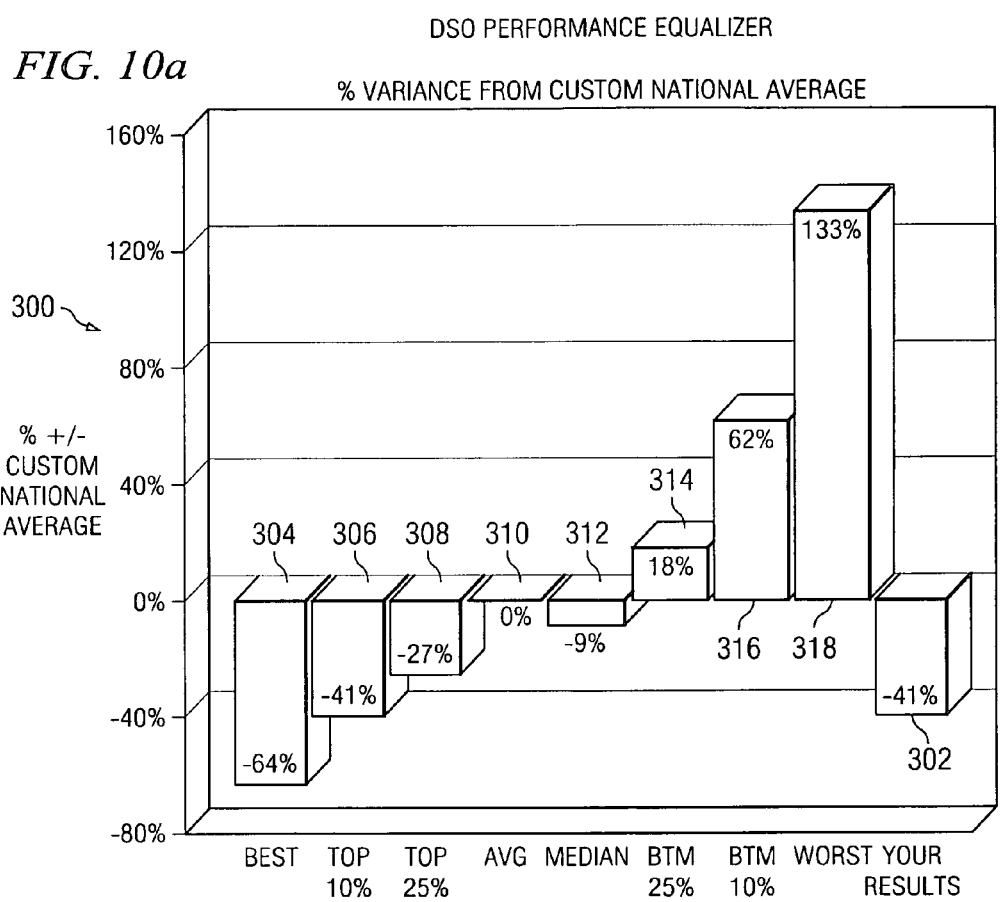
FIG. 10a is a bar chart that illustrates the comparison of a days sales outstanding equalizer for a particular healthcare provider to days sales outstanding equalizer information for other healthcare providers and to aggregated equalizer information.

FIG. 10*a* is a bar chart 300 that illustrates the comparison of a days sales outstanding equalizer for a particular healthcare provider to days sales outstanding equalizer information for other healthcare providers. The days sales outstanding equalizer may be calculated by comparing the weighted average days sales outstanding for a particular healthcare provider with the weighted average aggregate days sales outstanding. For example, the percentage difference between the weighted average days sales outstanding for a particular healthcare provider and the weighted average aggregate days sales outstanding may be calculated to determine the days sales outstanding equalizer value. In the bar chart 300, the higher the negative value translates into better performance in getting paid by a third-party payer in a timely fashion when compared to the aggregate of healthcare providers sampled.

A particular provider, such as the healthcare provider 12, may have its days sales outstanding equalizer information for a particular period of time displayed at bar 302. This may then be compared to the other bars shown in FIG. 10*a* for comparison with days sales outstanding equalizer information for other healthcare providers and to aggregated equalizer information. For example, bars 304 through 318 each represent various values that the bar 302 may be compared with to determine how this healthcare provider 12 is doing when compared to other healthcare providers. A bar 304 is shown with a days sales outstanding equalizer value of "−64%", which is denoted to be the best score of any healthcare provider analyzed by the ERN analysis system of the present invention for a particular sample of ERN claim adjudication information for a plurality of healthcare providers. The bar 306 indicates that "−41%" is the DSO equalizer of the top ten percent of the healthcare providers being analyzed. Thus, in the bar chart 300, the bar 302 indicates that the particular healthcare provider is right even with the top ten percent of the sampled healthcare providers.

Bar 308 shows that "−27%" is the DSO equalizer of the top twenty-five percent, which bar 310 is the average, bar 312 is the median, bar 314 is the bottom twenty-five percent, bar 316 is the bottom ten percent, and bar 318 is the worst healthcare provider of the included healthcare providers.

Figure 10B:
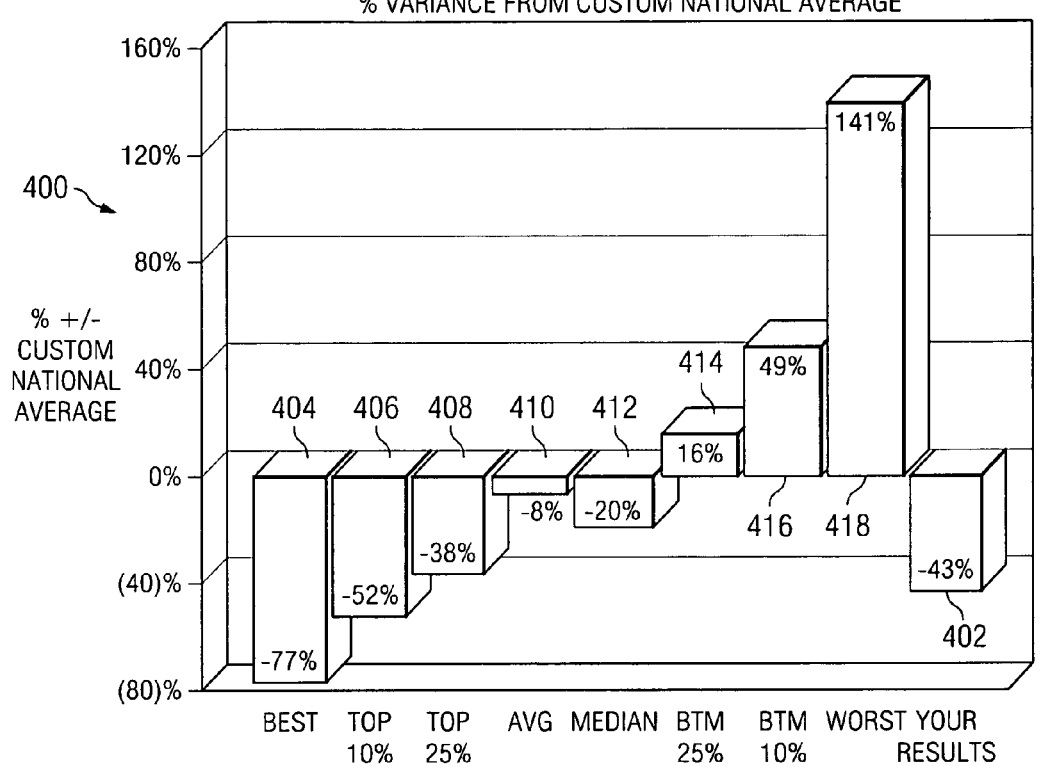
FIG. 10b is a bar chart that illustrates the comparison of a denial rate equalizer for a particular healthcare provider to denial rate equalizer information for other healthcare providers and to aggregated equalizer information.

FIG. 10*b* is a bar chart 400, similar to bar chart 300 of FIG. 10*a*, that illustrates the comparison of a denial rate equalizer for a particular healthcare provider to denial rate equalizer information for other healthcare providers and to aggregated equalizer information. The description accompanying FIG. 10*a* applies also to FIG. 10*b* except that the values being calculated, compared and analyzed are denial rate equalizer values. For example, the denial rate equalizer may be calculated by comparing the weighted average denial rate for a particular healthcare provider with the weighted average aggregate denial rate using the weighting factor for the particular healthcare provider just mentioned. The percentage difference between the weighted average denial rate for a particular healthcare provider and the weighted average aggregate denial rate may be calculated to determine the denial rate equalizer value. In the bar chart 400, the higher the negative value translates into better performance in getting fewer claims denied when compared to the aggregate of healthcare providers sampled.

Bar 402 is shown on the right of the chart, and may be compared to the various bars 404 through 418, as shown on the bar chart 400. This is similar to the values as described in connection with FIG. 10a.

FIG. 10c is a bar chart that illustrates the comparison of a composite equalizer, which may be determined by calculating an average or a weighted average of the days sales outstanding equalizer, such as that shown by bar 302 of FIG. 10a, and the denial rate equalizer, such as that shown by bar 402 of FIG. 10b for a particular healthcare provider, to composite equalizer information for the other healthcare providers. For example, the days sales outstanding equalizer is shown being weighted by 25% and the denial rate equalizer by 75% to generate the value of bar 502. This can then be compared to the bars 504 through 518, as was discussed above. The various values of bars 504 through 518 may be calculated by weighting as just described between the days sales outstanding equalizer and the denial rate equalizer.

Thus, it is apparent that there has been provided, in accordance with the present invention, a system and method for electronic remittance notice analysis that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented.

Also, the components, techniques, systems, sub-systems, layers, compositions and methods described and illustrated in the preferred embodiment as discrete or separate may be combined or integrated with other components, systems, modules, techniques, or methods without departing from the scope of the present invention. Other examples of changes, substitutions, and alterations are readily ascertainable by one skilled in the art and could be made without departing from the spirit and scope of the present invention.

What is claimed is:

1. An electronic remittance notice analysis system, comprising:
a database component operable to maintain electronic remittance notice information for a plurality of healthcare providers, the electronic remittance notice information includes claim adjudication information for a plurality of claims for each of the plurality of healthcare providers and for a plurality of procedures, the claim adjudication information includes information for each of the plurality of claims that includes healthcare provider identifier information, date information, procedure information, denial/allowance information, and financial information; and
a processor component operable to access the database component and determine, for a period of time and for a plurality of claims, an average denial rate for each of the plurality of procedures for one of the plurality of healthcare providers, an average aggregate denial rate for each of the plurality of procedures for the plurality of healthcare providers, a weighting factor for each of the plurality of procedures for the one of the plurality of healthcare providers based on the financial information, the processor further operable to determine a weighted average denial rate for the period of time for the one of the plurality of healthcare providers based on the weighting factor for each of the plurality of procedures for the one of the plurality of healthcare providers, and a weighted average aggregate denial rate for the period of time for the plurality of healthcare providers based on the weighting factor for each of the plurality of procedures for the one of the plurality of healthcare providers, the processor component is further operable to compare the weighted average denial rate and the weighted average aggregate denial rate, and the processor component is further operable to determine a percentage difference between the weighted average denial rate and the weighted average aggregate denial rate to generate a denial rate equalizer.

2. The electronic remittance notice analysis system of claim 1, wherein the financial information includes an amount billed for a procedure.

3. The electronic remittance notice analysis system of claim 1, wherein the financial information includes an amount allowed for a procedure.

4. The electronic remittance notice analysis system of claim 1, wherein the financial information includes an amount paid for a procedure.

5. The electronic remittance notice analysis system of claim 1, wherein the financial information includes an average days sales outstanding for a procedure.

6. The electronic remittance notice analysis system of claim 1, wherein the electronic remittance notice information is generated by one or more third party payers.

7. The electronic remittance notice analysis system of claim 1, wherein the processor component is further operable to access the database component and determine, for a period of time and for a plurality of claims, an average days sales outstanding for each of the plurality of procedures for one of the plurality of healthcare providers, an average aggregate days sales outstanding for each of the plurality of procedures for the plurality of healthcare providers, a days sales outstanding weighting factor for each of the plurality of procedures for the one of the plurality of healthcare providers based on the financial information, the processor further operable to determine a weighted average days sales outstanding for the period of time for the one of the plurality of healthcare providers based on the days sales outstanding weighting factor for each of the plurality of procedures for the one of the plurality of healthcare providers, and a weighted average aggregate days sales outstanding for the period of time for the plurality of healthcare providers based on the days sales outstanding weighting factor for each of the plurality of procedures for the one of the plurality of healthcare providers, the processor component is further operable to compare the days sales outstanding and the weighted average aggregate days sales outstanding, and the processor component is further operable to determine a percentage difference between the weighted average denial rate and the weighted average aggregate denial rate to generate a denial rate equalizer.

8. The electronic remittance notice analysis system of claim 7, wherein the financial information includes an amount billed for a procedure.

9. The electronic remittance notice analysis system of claim 7, wherein the financial information includes an amount allowed for a procedure.

10. The electronic remittance notice analysis system of claim 7, wherein the financial information includes an amount paid for a procedure.

11. The electronic remittance notice analysis system of claim 7, wherein the financial information includes an average denial rate for a procedure.

12. The electronic remittance notice analysis system of claim 7, wherein the electronic remittance notice information is generated by a third party payer.

13. The electronic remittance notice analysis system of claim 7, wherein the processor component is further operable to determine a composite equalizer based on an average of the denial rate equalizer and the days sales outstanding equalizer.

14. The electronic remittance notice analysis system of claim 13, wherein the average of the denial rate equalizer and the days sales outstanding equalizer is a weighted average.

15. An electronic remittance notice analysis system, comprising:
a database component operable to maintain electronic remittance notice information for a plurality of healthcare providers, the electronic remittance notice information includes claim adjudication information for a plurality of claims for each of the plurality of healthcare providers and for a plurality of procedures, the claim adjudication information includes information for each of the plurality of claims that includes healthcare provider identifier information, date information, procedure information, denial/allowance information, and payment information; and
a processor component operable to access the database component and determine, for a period of time and for a plurality of claims, an average days sales outstanding for each of the plurality of procedures for one of the plurality of healthcare providers, an average aggregate days sales outstanding for each of the plurality of procedures for the plurality of healthcare providers, a weighting factor for each of the plurality of procedures for the one of the plurality of healthcare providers based on the payment information, the processor is further operable to determine a weighted average days sales outstanding for the period of time for the one of the plurality of healthcare providers based on the weighting factor for each of the plurality of procedures for the one of the plurality of healthcare providers, and a weighted average aggregate days sales outstanding for the period of time for the plurality of healthcare providers based on the weighting factor for each of the plurality of procedures for the one of the plurality of healthcare providers, and the processor component is further operable to determine a percentage difference between the weighted average days sales outstanding and the weighted average aggregate days sales outstanding to generate a days sales outstanding equalizer.

16. The electronic remittance notice analysis system of claim 15, wherein the payment information includes an amount billed for a procedure.

17. The electronic remittance notice analysis system of claim 15, wherein the payment information includes an amount allowed for a procedure.

18. The electronic remittance notice analysis system of claim 15, wherein the payment information includes an amount paid for a procedure.

19. The electronic remittance notice analysis system of claim 15, wherein the payment information includes an average denial rate for a procedure.

20. A computerized method for analyzing electronic remittance notice information, comprising:
receiving electronic remittance notice information from a third party payer in a computer database, the electronic remittance notice information includes claim adjudication information for a plurality of claims for each of a plurality of healthcare providers and for a plurality of procedures, the claim adjudication information includes healthcare provider identifier information, date information, procedure information, denial/allowance information, and financial information;
determining, for a period of time and for the plurality of claims for each of the plurality of procedures, an average denial rate for each of the plurality of procedures for one of the plurality of healthcare providers;
determining, for the period of time and based upon at least part of the plurality of claims, an average aggregate denial rate for each of the plurality of procedures for the plurality of healthcare providers;
determining a weighting factor for each of the plurality of procedures for the one of the plurality of healthcare providers based on the financial information;
determining a weighted average denial rate for the period of time for the one of the plurality of healthcare providers based on the weighting factor for each of the plurality of procedures for the one of the plurality of healthcare providers; and
determining a weighted average aggregate denial rate for the period of time for the plurality of healthcare providers based on the weighting factor for each of the plurality of procedures for the one of the plurality of healthcare providers;
comparing the weighted average denial rate and the weighted average aggregate denial rate;
determining a percentage difference between the weighted average denial rate and the weighted average denial rate to generate a denial rate equalizer; and
outputting reports of custom benchmark information generated by the method.

21. The method of claim 20, wherein the electronic remittance notice information is generated by one or more third party payers.

22. The method of claim 20, further comprising:
determining, for the period of time and for the plurality of claims, an average days sales outstanding for each of the plurality of procedures for one of the plurality of healthcare providers;
determining, for the period of time and based upon at least part of the plurality of claims, an average aggregate days sales outstanding for each of the plurality of procedures for the plurality of healthcare providers;
determining a weighted average days sales outstanding for the period of time for the one of the plurality of healthcare providers based on the weighting factor for each of the plurality of procedures for the one of the plurality of healthcare providers; and
determining a weighted average aggregate days sales outstanding for the period of time for the plurality of healthcare providers based on the weighting factor for each of the plurality of procedures for the one of the plurality of healthcare providers.

23. The method of claim 22, further comprising:
determining a percentage difference between the weighted average denial rate and the weighted average aggregate denial rate to generate a denial rate equalizer; and
determining a percentage difference between the weighted average days sales outstanding and the weighted average aggregate days sales outstanding to generate a days sales outstanding equalizer.

24. The method of claim 23, further comprising:

determining a composite equalizer based on an average of the denial rate equalizer and the days sales outstanding equalizer for analyzing the claim adjudication information.

25. The method of claim 20, further comprising:

receiving the electronic remittance notice information from the system of the one of the plurality of healthcare providers; and communicating at least a portion of the electronic remittance notice information to the analysis system.

26. The method of claim 25, wherein the communication of the at least a portion of the electronic remittance notice information further includes:

providing an agent on the one of the plurality of healthcare provider systems to initiate transmission to the analysis system.

* * * * *